US012759314B2

(12) United States Patent
Kötz et al.

(10) Patent No.: US 12,759,314 B2
(45) Date of Patent: Oct. 13, 2026

(54) PRINTING DEVICE FOR INDIVIDUALLY PRINTING WEBS OR SHEETS OF PRINTING SUBSTRATES

(71) Applicant: KOLBUS GROUP GMBH, Rahden (DE)

(72) Inventors: Manuel Kötz, Leipzig (DE); Randolf Voigtländer, Colditz (DE); Falk Preuss, Leipzig (DE)

(73) Assignee: Kolbus Group GmbH, Rahden (DE)

(*) Notice: Subject to any disclaimer, the term of this patent is extended or adjusted under 35 U.S.C. 154(b) by 47 days.

(21) Appl. No.: 18/728,733

(22) PCT Filed: Jan. 6, 2023

(86) PCT No.: PCT/EP2023/050220
§ 371 (c)(1),
(2) Date: Jul. 12, 2024

(87) PCT Pub. No.: WO2023/135059
PCT Pub. Date: Jul. 20, 2023

(65) Prior Publication Data

US 2025/0074076 A1 Mar. 6, 2025

(30) Foreign Application Priority Data

Jan. 13, 2022 (DE) ..................... 10 2022 100 700.6

(51) Int. Cl.
*B41J 2/175* (2006.01)
*B41J 2/145* (2006.01)
*B41J 3/54* (2006.01)
*B41J 25/00* (2006.01)

(52) U.S. Cl.
CPC ............... *B41J 3/543* (2013.01); *B41J 2/145* (2013.01); *B41J 2/17596* (2013.01); *B41J 25/001* (2013.01)

(58) Field of Classification Search
CPC ........ B41J 3/543; B41J 2/145; B41J 2/17596; B41J 25/001
See application file for complete search history.

(56) References Cited

U.S. PATENT DOCUMENTS

| | | | | |
|---|---|---|---|---|
| 2013/0100207 | A1* | 4/2013 | Van Der Zwan | B41J 25/308 347/37 |
| 2017/0291417 | A1* | 10/2017 | Okubo | B41J 2/14072 |
| 2022/0001663 | A1* | 1/2022 | Hashimoto | B41J 2/2146 |

FOREIGN PATENT DOCUMENTS

| | | | |
|---|---|---|---|
| EP | 3147128 | A1 | 3/2017 |
| WO | 2011157282 | A1 | 12/2011 |
| WO | 2016174643 | A1 | 11/2016 |

OTHER PUBLICATIONS

PCT International Search Report and Written Opinion for International Application No. PCT/EP2023/050220 filed Jan. 6, 2023, Date of Mailing: Apr. 4, 2023, 12pgs.

* cited by examiner

*Primary Examiner* — Jason S Uhlenhake
(74) *Attorney, Agent, or Firm* — Alix, Yale & Ristas, LLP

(57) ABSTRACT

A printing device for individually printing webs or sheets of printing substrates according to the ink jet principle comprises a plurality of identical printing units that can be individually positioned transversely, with every printing unit comprising two print heads and being suitable to form a separate printing region or, together with one or more neighboring printing units, to form a common, continuous printing region without ink voids.

11 Claims, 2 Drawing Sheets

PRINTING DEVICE FOR INDIVIDUALLY PRINTING WEBS OR SHEETS OF PRINTING SUBSTRATES

BACKGROUND

The present invention pertains to a printing device for individually printing webs, sheets or boards of printing substrates according to the preamble of claim 1.

Printing devices that are suitable for individually printing predefined regions of a web or a sheet of a printing substrate are known, in particular, from the field of paper conversion and the production of boxes and containers from gray board or corrugated board. In this case, the printing substrate is guided along a print head, which is stationary with respect to the printing process, in a horizontal plane. The print head usually operates in accordance with the ink jet principle.

It is frequently not necessary to print the complete side of a printing substrate. It usually suffices to print a strip-shaped region. For cost reasons, WO2016174643A1 proposes the use of a print head, the printing width of which is significantly smaller than the width of the printing substrate. In this case, the printing width of the print head defines the maximum width of the printable strip.

A positioning device for the print head is proposed in order to be able to vary the position of the printable region in dependence on the product. To this end, the print head is received in the machine frame by means of a transversally arranged linear guide. The print head can be freely positioned transverse to the feed direction of the printing substrate along this guide.

To this end, the print head is received in a carriage that has an adjustment drive, as well as elements for supplying and for controlling the print head. A gear wheel of this adjustment drive engages into a gear rack that is rigidly mounted in the frame and extends parallel to the linear guide.

The maximum printable width in one pass is defined by the print head. The costs of a print head increase disproportionately with its printing width. This is why it is desirable to use a print head with the smallest printing width possible. However, this correspondingly limits the design options of the print image, particularly if multiple print images are separated from one another in the transverse direction.

SUMMARY

The present invention, in contrast, is based on the objective of making available a printing device, particularly a printing device for printing cardboard or corrugated board or similar materials, by means of which the aforementioned disadvantages can be avoided in a technically simple manner with cost-efficient means.

According to the invention, the above-defined objective is attained in a generic a printing device with the features of the characterizing portion of claim 1. Advantageous enhancements of the invention are characterized by the features disclosed in the dependent claims.

According to the invention, the printing device has a plurality of printing units, wherein the printing units are arranged adjacent to one another in the material flow direction. Each of the printing units can be individually positioned transverse to the material flow direction along a linear guide by means of an adjustment device.

The use of multiple printing units with small printing width significantly broadens the design options of the print image with low costs in that the printing units can be freely positioned relative to one another transverse to the material flow direction. The positions of the printable strips on the printing substrate can be chosen within a wide range.

In addition, the plurality of identical print heads leads to a redundancy such that the availability of the printing device is increased.

Each of the printing units is formed by a frame, which accommodates a primary reservoir that serves as the main supply, a secondary reservoir that serves as a buffer and a pump in order to supply the respective printing unit with ink. To this end, the frame may be realized in the form of a housing.

The frame of the printing unit respectively accommodates at least two print heads. The print heads are oriented in the same printing direction and aligned at the same printing plane. The printing plane corresponds to a plane defined by the printing substrate. The use of a plurality of identical print heads with relatively small printing width allows a simple adaptation to different customer requirements by adapting the number of identical printing units.

The print heads of a printing unit preferably are arranged transversally offset to one another. In this way, the print heads can jointly print a wider track. In an advantageous embodiment, the printing regions of the print heads of the same printing unit directly border on one another viewed in the transverse direction. The region printable with only one printing unit is thereby maximized. In a particularly advantageous embodiment, the print heads are arranged relative to one another in the transverse direction in such a way that their individual printing regions slightly overlap. This makes it possible to prevent ink voids in the print image as a result of geometric tolerances.

It is advantageous to arrange the print heads of a printing unit in an offset manner in the material flow direction. In this way, the print heads, as well as their mountings, can be designed in a simple and sufficiently robust manner, particularly when printing regions border on one another transversally.

It is particularly advantageous to realize a cranked contour of the printing units in a view from the printing plane. In this case, the print heads of each printing unit are respectively arranged in one leg of the crank such that they are offset relative to one another in the longitudinal direction and in the transverse direction. When a common guide rails is used, this makes it possible to position the printing units relative to one another in the transverse direction in such a way that multiple adjacent printing units jointly form a continuous printing region without interruptions. A very high variability of the printing regions is thereby achieved with a compact design.

Adjustment devices make it possible to individually position the printing units in the transverse direction in an automated manner. To this end, the printing units respectively have an adjustment drive with a controllable motor. It would alternatively be possible to use a single adjustment drive that temporarily acts upon an individual printing unit.

BRIEF DESCRIPTION OF THE DRAWINGS

An exemplary embodiment of the invention is described below with reference to the figures, to which we refer with respect to all details that are not described in greater detail in the description. In these figures.

DETAILED DESCRIPTION

Figure 1:
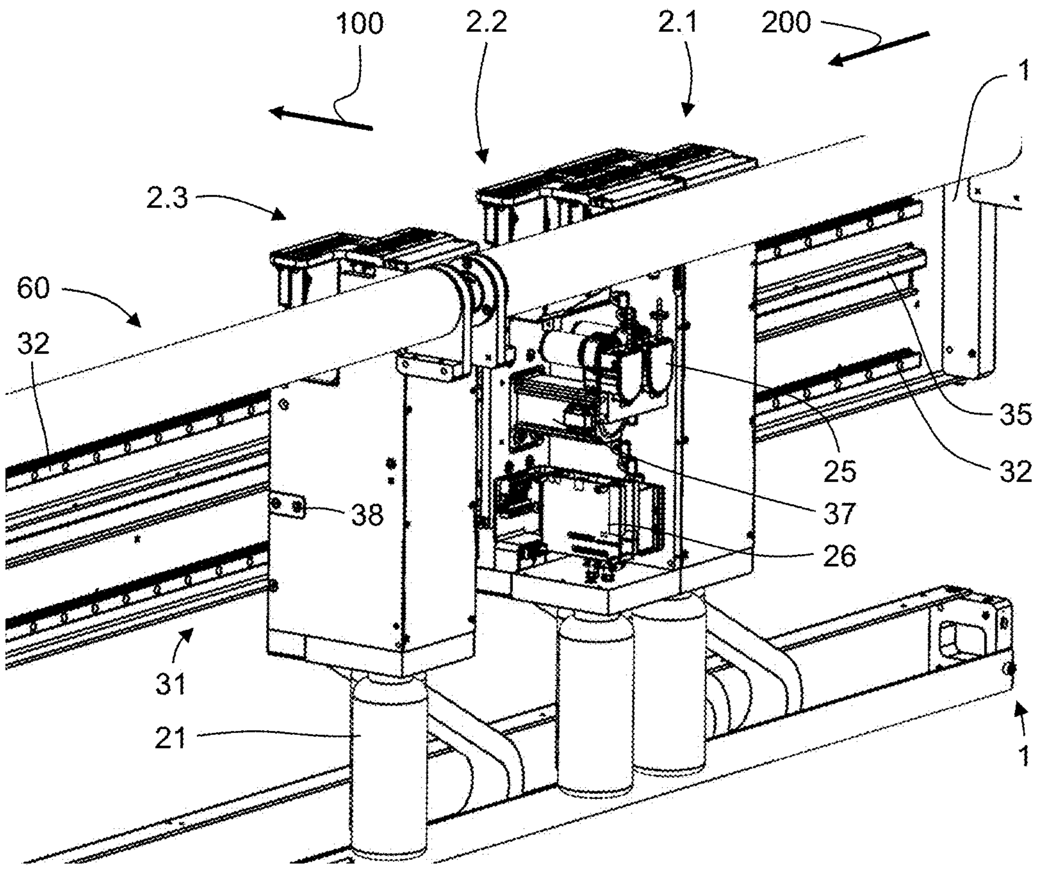
FIG. 1 shows a perspective view of a printing device with three identical printing units.

FIG. 1 shows three identical printing units 2.1, 2.2, 2.3 of a printing device. The illustration of three printing units 2.1, 2.2, 2.3 merely serves as an example. The printing device may also comprise two printing units or an arbitrary number of printing units 2.1, 2.2, 2.3 depending on the respective application.

Figure 2:
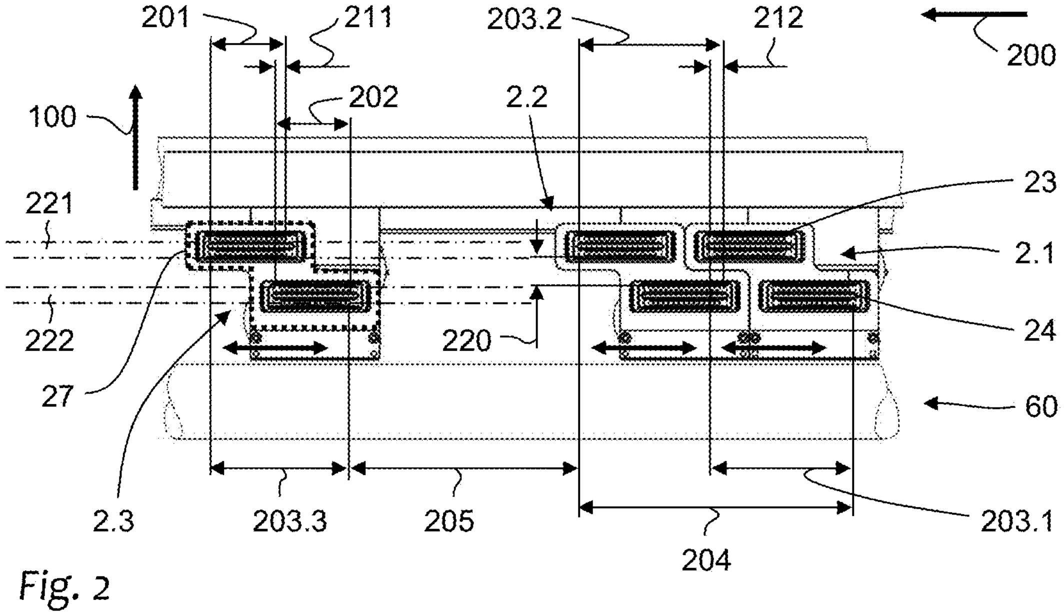
FIG. 2 shows a view of a printing device with three identical printing units opposite to the printing direction.

The printing units 2.1, 2.2, 2.3 are arranged in a machine frame 1 stationarily with respect to the printing process. The not-shown printing substrate is moved past the print heads 23, 24 in a material flow direction 100. The material flow direction 100 extends horizontally and defines the longitudinal axis of the printing device. A transport device 60 of conventional design is provided for the feed of the printing substrate. FIG. 1 and FIG. 2 merely show parts of this transport device 60 arranged in the machine frame 1.

The printing units 2.1, 2.2, 2.3 are received in the machine frame 1 by means of linear guides 31. The guide carriages 33 are fastened on the printing units 2.1, 2.2, 2.3. They are jointly mounted on two guide rails 32 that extend parallel to one another. The guide rails 32 are oriented transverse to the material flow direction 100. In this way, the printing units 2.1, 2.2, 2.3 and therefore their printing regions 201, 202, 203, 204 can be positioned in a transverse direction 200. The position changes are indicated in FIG. 2 with double arrows. The printing units 2.1, 2.2, 2.3 are arranged adjacent to one another with respect to the material flow direction 100.

The print heads 23, 24 of the printing units 2.1, 2.2, 2.3 form a common printing plane. This printing plane is identical to the printing substrate plane 1000 defined by the printing substrate. The printing direction 300 extends vertically from the bottom toward the top in the exemplary embodiment illustrated in FIG. 1. Other printing directions such as from the top toward the bottom are also possible.

Figure 3:
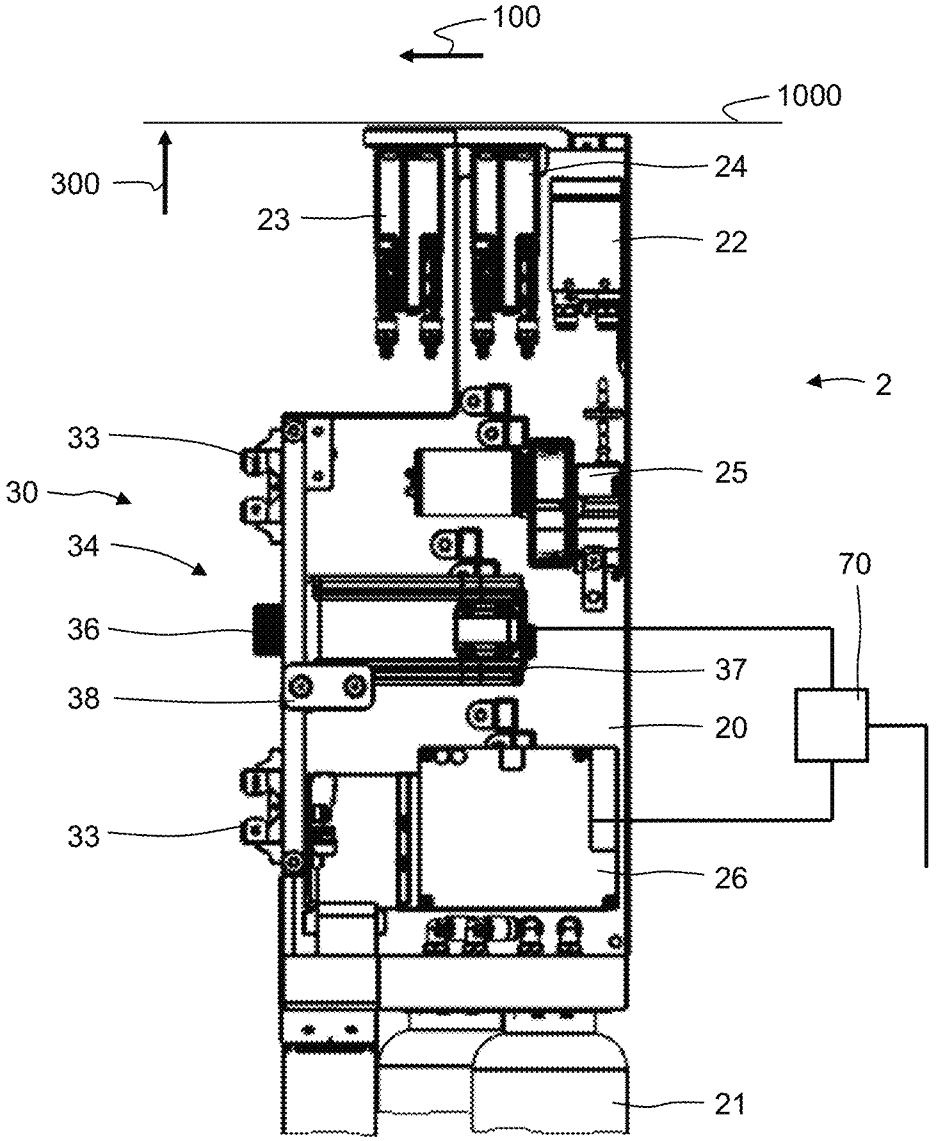
FIG. 3 shows a view of a printing unit in the transverse direction.

The design of an individual printing unit 2, 2.1, 2.2, 2.3 is described exemplarily below with reference to FIG. 3. Two identical print heads 23, 24 are received in a common frame 20 with the same orientation. They are respectively suitable for producing a plurality of adjacent print dots simultaneously in a common printing direction 300. The arrangement of these print dots extends in the form of a row in a transverse direction 200 and defines the printing widths 201, 202, 203.1, 203.2, 203.3. The two print heads 23, 24 are arranged offset to one another in the material flow direction 100, as well as in the transverse direction 200.

A primary ink reservoir 21 is arranged on the frame 20. This primary ink reservoir 21 may consist of multiple containers as illustrated in FIG. 1 and FIG. 3. The primary reservoir 21 is connected to a pump 25 arranged within the frame 20, which is realized in the form of a housing, by means of not-shown suction lines. On the pressure side, the pump 25 is connected to a secondary ink reservoir 22 by means of lines that are likewise not illustrated in the figures. This secondary ink reservoir 22 supplies the print heads 23, 24 with ink via not-shown lines.

Depending on the print image to be produced and the transport speed of the printing substrate, the periodic change of the instantaneous delivery of ink through the print heads 23, 24 may be significantly greater than permitted by the dynamics of the pump 25. The secondary reservoir 22, which is arranged at the same vertical height as the print heads 23, 24, is suitable for buffering such brief fluctuations of the ink demand. It allows a more uniform and therefore gentler operation of the pump 25. The secondary reservoir 22 is significantly smaller than the primary reservoir 21.

Two guide carriages 33 of the linear guides 31 are arranged on a side of the frame 20 that points in the material flow direction 100. They are arranged on top of one another and aligned parallel to one another.

The printing unit 2, 2.1, 2.2, 2.3 can be positioned in the transverse direction 200 along the linear guide 31 by means of an adjustment device 30. To this end, a gear rack 35 is arranged in the machine frame 1 parallel to the linear guide 31. The gear wheel 36 of an adjustment drive 34 engages into this gear rack 35 that is stationarily mounted in the frame. The gear wheel 36 is arranged on the frame 20 of the printing unit 2, 2.1, 2.2, 2.3 and driven by a controllable motor 37. The controllable motor 37 of the adjustment drive 34 is arranged within the printing unit 2, 2.1, 2.2, 2.3. It is connected to a central control 70 of the printing device by means of cables.

The adjustment device 30 makes it possible to position adjacent printing units 2, 2.1, 2.2, 2.3 in the transverse direction 200 in such a way that the printing regions 201, 202, 203, 204 have a predetermined distance 205 from one another. The minimum distance is reached when the two adjacent printing units 2, 2.1, 2.2, 2.3 bottom out against a hard stop.

In this bottomed-out position, manufacturing tolerances and installation tolerances lead to different positions of the transverse printing regions 203.1, 203.2, 203.3 of the printing units 2, 2.1, 2.2, 2.3 relative to one another. Spacer plates 38 arranged between the printing units 2, 2.1, 2.2, 2.3 are provided in order to compensate these differences. The spacer plates 38 are respectively arranged on the frame 20 of a printing unit 2, 2.1, 2.2, 2.3. Their thickness is respectively chosen in such a way that the transverse positioning of the printing regions 203.1, 203.2, 203.3 of two adjacent printing units 2, 2.1, 2.2, 2.3 relative to one another respectively corresponds to a predefined dimension.

Alternatively, the spacer plates 38 may also be designed adjustably, e.g. by means of jack screws, or other adjustable spacer elements such as clampable cams may be used.

Electronic components 26 required for the control of the print heads 23, 24 are likewise accommodated in the frame 20 that is realized in the form of a housing. These electronic components 26 are also connected to the control 70 of the printing device.

Due to the displacement along the linear guide 31, each print head 23, 24 forms a transverse track 221, 222 that maps the printable region. The first print head 23 forms a first transverse track 221 and the second print head 24 forms a second transverse track 222. Both tracks 221, 222 are compulsorily parallel to one another and to the linear guide 31. The tracks 221, 222 are spaced apart from one another by a distance 220 in the material flow direction 100, wherein said distance is predetermined by the arrangement of the print heads 23, 24 within the printing unit 2, 2.1, 2.2, 2.3. In this case, the first tracks 221 of the adjacent printing units 2, 2.1, 2.2, 2.3 are identical. The second tracks 222 of the adjacent printing units 2, 2.1, 2.2, 2.3 are likewise identical.

The printing region 201, 202 of a print head 23, 24 within its track 221, 222 results from the design of the print head 23, 24 and its transverse position. The print heads 23, 24 of a printing unit 2, 2.1, 2.2, 2.3 are arranged relative to one another in the transverse direction 200 in such a way that their printing regions 201, 202 border on one another. In order to reliably preclude ink voids in the print image, the two printing regions 201, 202 of a printing unit 2, 2.1, 2.2, 2.3 slightly overlap one another and form a first overlap 211.

Two adjacent printing units 2, 2.1, 2.2, 2.3 form a common printing region 204 when they are positioned relative to one another in the bottomed-out position. This arrangement is illustrated in FIG. 2 with reference to the two printing units 2.1 and 2.2 and can be transferred to all adjacent printing units 2, 2.1, 2.2, 2.3. The printing regions 203.1, 203.2, 203.3 of adjacent printing units 2, 2.1, 2.2, 2.3 directly border on one another analogous to the first printing region 201 of the first print head 23 and the second printing region 202 of the second print head 24 of the same printing unit 2, 2.1, 2.2, 2.3. They may likewise overlap one another and form a second overlap 212 in order to prevent ink voids in the print image.

In the printing substrate plane, the printing units 2, 2.1, 2.2, 2.3 respectively have a cranked contour 27 that is illustrated with dotted lines in FIG. 2. The crank makes it possible to arrange the print heads 23, 24 of one respective printing unit 2, 2.1, 2.2, 2.3 in such an offset manner in the material flow direction 100 and in the transverse direction 200 that the first printing region 201 of a first print head 23 directly borders on the second printing region 202 of a second print head 24 of the adjacent printing unit 2.2 as illustrated in FIG. 2. The contour 27 may have a gearing as an alternative to a simple crank.

LIST OF REFERENCE SYMBOLS

1 Frame
2 Printing unit
2.1 First printing unit
2.2 Second printing unit
2.3 Third printing unit
20 Frame
21 Primary reservoir
22 Secondary reservoir
23 First print head
24 Second print head
25 Pump
26 Electronic components
27 Contour in printing substrate plane
30 Adjustment device
31 Linear guide
32 Guide rail
33 Guide carriage
34 Adjustment drive
35 Gear rack
36 Gear wheel
37 Controllable motor
38 Spacer plate
60 Transport device
70 Control
100 Material flow direction
200 Transverse direction
201 Printing region of first print head
202 Printing region of second print head
203.1 Printing region of first printing unit
203.2 Printing region of second printing unit
203.3 Printing region of third printing unit
204 Common fourth printing region
205 Distance between adjacent printing regions
211 First overlap within a printing unit
212 Second overlap between two printing units
220 Distance in material flow direction
221 First transverse track
222 Second transverse track
300 Printing direction
1000 Printing substrate plane

The invention claimed is:

1. A printing device for individually printing webs, sheets or boards of printing substrates according to the ink jet principle, wherein the printing substrate defines a printing substrate plane and the printing device comprising:

a machine frame (1);

a transport device (60) that is designed for transporting the printing substrate in an essentially linear material flow direction (100) within the printing substrate plane;

two identical printing units (2, 2.1, 2.2, 2.3) that are arranged behind one another in a direction (200) extending transverse to the material flow direction (100), wherein each of the two printing units (2, 2.1, 2.2, 2.3) respectively has a frame (20) and includes;

a first print head (23), which is designed and can be controlled in such a way that it is suitable for delivering and transferring liquid ink to the printing substrate in a predefined manner;

a primary reservoir (21) for storing a first quantity of liquid ink;

a secondary reservoir (22) for storing a second quantity of liquid ink; and a pump (25) for conveying the liquid ink, wherein the primary reservoir (21), secondary reservoir (22), and pump (25) are arranged in the frame (20), primary reservoir (21), the secondary reservoir (22) and the pump (25) are connected to one another and to the first print head (23) to convey the liquid ink to supply the first print head (23) with liquid ink;

wherein the two printing units (2, 2.1, 2.2, 2.3) respectively have a second print head (24), wherein the first and the second print head (23, 24) of the same printing unit (2, 2.1, 2.2, 2.3) are respectively accommodated in the frame (20) of the printing unit (2, 2.1, 2.2, 2.3) and have a printing region (203.1, 203.2) and a printing plane, the printing planes of the two print heads (23, 24) of a printing unit (2, 2.1, 2.2, 2.3) are identical to the same printing substrate plane (1000), and the printing regions (203.1, 203.2) of the two printing units (2.1, 2.2) alternately either form a common and uninterrupted printing region (204) at least in the transverse direction (200), wherein the printing regions (203.1, 203.2) of the two printing units (2.1, 2.2) directly border on one another or partially overlap one another and respectively form a second overlapping region (212) or form printing regions (203.2, 203.3) that are spaced apart from each other in the transverse direction.

2. The printing device of claim 1, wherein the two print heads (23, 24) of the same printing unit (2, 2.1, 2.2, 2.3) each have a printing region (201, 202) and are arranged offset to one another in the transverse direction (200) in such a way that their printing regions (201, 202) partially overlap in the transverse direction (200) and form a first overlapping region (211).

3. The printing device of claim 2, wherein the printing regions (201, 202) of each printing unit (2, 2.1, 2.2, 2.3) respectively correspond to a multiple of the overlap (211) of these printing regions (201, 202) in the transverse direction (200).

4. The printing device of claim 1, wherein the two print heads (23, 24) of the same printing unit (2, 2.1, 2.2, 2.3) are arranged relative to one another in the transverse direction (200) in such a way that their printing regions (201, 202) directly border on one another in the transverse direction (200).

5. The printing device of claim 1, wherein the two printing units (2, 2.1, 2.2, 2.3) are respectively received in the machine frame (1) such that they can be moved individually in the transverse direction (200).

6. The printing device of claim 5, comprising an adjustment device (30) for each of the two printing units (2, 2.1, 2.2, 2.3), wherein each adjustment device (30) respectively has one controllable motor (37) that communicates with the control (70) of the printing device.

7. The printing device of claim 5, comprising a common adjustment device for the two printing units (2, 2.1, 2.2, 2.3) with a controllable motor that communicates with the control (70) of the printing device, wherein the common adjustment device is operatively connected to one of the at least two printing units (2, 2.1, 2.2, 2.3) in an alternating manner.

8. The printing device of claim 5, wherein the frame (20) of a first printing unit (2.1) of the two printing units (2, 2.1, 2.2, 2.3) has a spacer (38), wherein the spacer (38) is arranged so as to face a second printing unit (2.2) of the two printing units (2, 2.1, 2.2, 2.3) located adjacent to the first printing unit (2.1) such that the spacer (38) limits a variable distance between the print heads (23, 24) of the first printing unit (2.1) and the print heads (23, 24) of the second printing unit (2.2) to a minimum dimension.

9. The printing device of claim 1, wherein the secondary reservoir (22) of the two printing units (2, 2.1, 2.2, 2.3) is vertically arranged essentially at the height of the two print heads (23, 24) of the same printing unit (2, 2.1, 2.2, 2.3).

10. The printing device of claim 1, wherein the two print heads 23, 24 of the same printing unit (2, 2.1, 2.2, 2.3) are offset to one another in the material flow direction (100) in the frame (20) in such a way that their printing regions are spaced apart from one another by a distance (220) in the material flow direction (100).

11. The device of claim 1, wherein the two printing units (2, 2.1, 2.2, 2.3) respectively have such a cranked or geared contour (27) in the printing substrate plane (1000) that these contours (27) of two adjacent printing units (2, 2.1, 2.2, 2.3) engage into one another.

* * * * *